United States Patent [19]

Tajima et al.

[11] Patent Number: 5,278,235
[45] Date of Patent: Jan. 11, 1994

[54] POLYACETAL RESIN COMPOSITION

[75] Inventors: Yoshihisa Tajima, Shimizu; Keiichi Miyawaki, Fuji, both of Japan

[73] Assignee: Polyplastics Co., Ltd., Osaka, Japan

[21] Appl. No.: 861,806

[22] PCT Filed: Dec. 13, 1991

[86] PCT No.: PCT/JP91/01713
§ 371 Date: Jun. 18, 1992
§ 102(e) Date: Jun. 18, 1992

[87] PCT Pub. No.: WO92/10541
PCT Pub. Date: Jun. 25, 1992

[30] Foreign Application Priority Data

Dec. 14, 1990 [JP] Japan .................. 2-402300

[51] Int. Cl.$^5$ .............. C08L 59/02; C08L 25/06; C08L 25/08; C08L 33/10
[52] U.S. Cl. .................. 525/154; 525/155; 525/165; 525/241; 525/227
[58] Field of Search ............ 525/154, 155, 165, 227, 525/241

[56] References Cited

U.S. PATENT DOCUMENTS 3,642,940  2/1972  Burg et al. .................. 525/155

FOREIGN PATENT DOCUMENTS 0329028   2/1988  European Pat. Off. ......... 525/154
1806704  11/1968  Fed. Rep. of Germany ...... 525/154
0108413   6/1985  Japan ......................... 525/154
2294352   5/1989  Japan ......................... 525/154
1026017   4/1966  United Kingdom ............. 525/154

Primary Examiner—James J. Seidleck
Assistant Examiner—W. R. H. Clark
Attorney, Agent, or Firm—Nixon & Vanderhye

[57] ABSTRACT

To provide a polyacetal resin composition having a minimal molding shrinkage and capable of forming a molding having good surface conditions and being resistant to friction and abrasion by solving a problem of delamination and problems posed in molding and processing when a polystyrene resin is incorporated into a polyacetal resin in order to improve its properties.

A thermoplastic polystyrene resin B is incorporated into a polyacetal resin A by using a thermoplastic acrylic resin C as the third component and a combination of components A and B each having a melt flow value satisfying a specified condition as the components A and B, said components A, B and C being used in amounts of 55 to 95 parts by weight, 43 to 3 parts by weight and 20 to 2 parts by weight, respectively, for 100 parts by weight of the sum of A, B and C.

4 Claims, No Drawings

POLYACETAL RESIN COMPOSITION

FIELD OF THE INVENTION

The present invention relates to a polyacetal resin composition, and more particularly, to a polyacetal resin composition yielding a favorable surface of resulting molded products, low frictional abrasion and low molding shrinkage percentage, blending thermoplastic polystyrene resin and thermoplastic acrylic resin while having polyacetal resin as its major component.

PRIOR ART

Polyacetal resin demonstrates superior moldability while also possessing balanced mechanical properties, electrical properties, heat resistance, chemical resistance and frictional abrasion characteristics, etc. Moreover, it also possesses outstanding fatigue resistance among plastic materials. Therefore, it is used in an extremely broad range of fields as a representative engineering plastic. However, accompanying expansion of its fields of use, the requirements on the performance of the resin are tending to become increasingly sophisticated. One of these requirements is improvement of shrinkage percentage. In other words, polyacetal resin demonstrates a high molding shrinkage percentage due to its high degree of crystallization. As a result, there are cases when this becomes a problem in applications such as precision parts, thin-walled parts and large parts. As careful mold design is required in consideration of this high molding shrinkage percentage, there are many cases in which improvement of the molding shrinkage percentage is desirable. In addition, although polyacetal resin is classified as having superior frictional abrasion characteristics, there are many cases in which further improvement is desirable.

In general, the blending of other resins has been attempted as a method for improving the various physical properties of polyacetal resin. Blending of polystyrene resin is one example of these attempts as is indicated in Japanese Patent Publication No. 44-946 and Japanese Patent Laid-Open No. 64-38463. The former focuses on a fibrous substance. However, according to studies conducted by the inventors of the present invention, the polymer mixture obtained by that described results in the strong appearance of layer separation and layer peeling phenomena when used for molding, thus giving it no practical value. In addition, although the latter discloses that the use of a specific highly viscous polystyrene resin is effective for overcoming the relevant problems, this still remains inadequate and has problems in terms of molding processing, particularly with respect to increasing the viscosity of the composition.

DISCLOSURE OF THE INVENTION

The present invention is generally directed to solving the above-mentioned problems for the purpose of providing a polyacetal resin composition demonstrating superior frictional abrasion characteristics and improved shrinkage percentage during molding in which the surface of molded products is uniform and smooth by improving dispersability, while eliminating obstacles such as the appearance of streaked phase separation structures on the surface of injection molded products based on defective dispersion of components and defective adhesion between resin phases, as well as the inhibition of frictional abrasion characteristics, one of the characteristics of polyacetal resins, due to the occurrence of surface layer separation caused by friction, in a polymer blend of polyacetal resin and inexpensive, thermoplastic polystyrene resin. It has therefore been discovered that the above-mentioned defects can be solved and that favorable polyacetal resin molded products can be obtained by blending specific amount of a specific thermoplastic acrylic resin as third component without using a specific high-viscosity polystyrene like that mentioned above, which led to the present invention.

In other words, the present invention relates to a polyacetal resin composition capable of forming a molding having good surface conditions, characterized by comprising a polyester resin A, a thermoplastic polystyrene resin B and a thermoplastic acrylic resin C in amounts of 55 to 95 parts by weight, 43 to 3 parts by weight and 20 to 2 parts by weight, respectively, for 100 parts by weight of the sum of A, B and C, said components A and B having a melt flow rate satisfying the following relation (1):

$$MRF(B)/MRF(A) = \frac{1}{3} \text{ to } 50 \qquad (1)$$

wherein MRF (A) represents the melt flow rate of the polyacetal resin A determined at 190° C. under a load of 2160 g according to ASTM D-1238 and MRF(B) represents the melt flow rate of the thermoplastic polystyrene resin B determined at 200° C. under a load of 5000 g according to ASTM D-1238.

Polyacetal resin of component A used in the present invention is a high molecular compound in which the primary structural unit is an oxymethylene group ($-CH_2O-$). Component A may be a polyoxymethylene homopolymer or a copolymer, terpolymer or block copolymer containing a small amount of structural units other than oxymethylene groups. In addition, the molecules of component A may be linear, branched or in the form of a cross-linked structure. Furthermore, there are no particular restrictions on its degree of polymerization and it is only required to have molding processability (for example, MRF(A)=1.5–70 in the above-mentioned measuring conditions).

Next, polystyrene resin of component B used in the present invention is, as well known, one which is primarily composed of styrene and is obtained by a radical polymerization reaction or ion polymerization reaction. Those which are obtained by industrial block polymerization, solution polymerization, suspension polymerization or emulsion polymerization can be used. In addition, polystyrene resin B of the present invention may be a resin prepared by copolymerizing a reactive monomer such as a vinyl compound other than styrene and a diene compound with stylene which is a main monomer, or a resin prepared by introducing a rubber component, provided that the properties of polystylene are not greatly impaired. In particular, polystyrene, poly-α-methylstyrene, or copolymers which are prepared by copolymerizing an acrylate, a methacrylate, acrylonitrile, butadiene or chlorinated ethylene with stylene which is a main monomer, are used preferentially. The ratio of the MRF value of component B to that of component A (MRF(A)/MRF(B)) is equal to or greater than $\frac{1}{3}$ and less than or equal to 50 in the measuring conditions described above, and preferably, $\frac{1}{2}$-25. Effects can be demonstrated sufficiently without the use of special high-viscosity substances eliminating the occurrence of difficulties in terms of molding processing due to having to increase the viscosity of the composition.

In addition, the acrylic resin of component C used in the present invention is a homopolymer obtained from acrylic acid or an acrylate (for example, methyl acrylate, ethyl acrylate, n-propyl acrylate, isopropyl acrylate, n-butyl acrylate, n-hexyl acrylate or n-octyl acrylate), methacrylic acid or a methacrylate (for example, methyl methacrylate, ethyl methacrylate, n-propyl methacrylate, isopropyl methacrylate, n-butyl methacrylate, isobutyl methacrylate, n-amyl methacrylate, n-octyl methacrylate, n-decyl methacrylate, or a copolymer of these, and moreover, may also be a copolymer comprising one or more of these acrylic monomer(s) as a main monomer, and a vinyl compound such as styrene and acrylonitrile or a diene compound such as butadiene and isoprene as a comonomer. Among these, homopolymer of methyl methacrylate, or copolymers comprising methyl methacrylate as a main monomer, and an other acrylate, a methacrylate other than methyl methacrylate, acrylic acid, methacrylic acid, stylene, acrylonitrile and so on, are used preferentially. Copolymers comprising an ester(s) obtained from methacrylic acid with an aliphatic alcohol(s) having 1 to 8 carbon atoms as a monomer are particularly preferable. Although there are no restrictions on the molecular weight and so on of component C, straight chain substances having a low viscosity are preferable in terms of processability.

Next, with respect to the blending amounts of each of the components in the composition of the present invention, in the case of taking the total amount of components A, B and C to be 100 parts by weight, the blended amount of the polyacetal resin of component A is 55 parts by weight or more. If the amount of component A is less than 55 parts by weight, the inherent characteristics of the polyacetal resin will be lost resulting in particular in a decrease in mechanical strength, thus making this undesirable.

The blended amount of the polystyrene resin of component B is 43-3 parts by weight, and preferably 35-5 parts by weight. If the amount of component B is less than 3 parts by weight, effects resulting in an improved shrinkage percentage during molding are not obtained, thus making this undesirable. In addition, the blended amount of the acrylic resin of component C is 20-2 parts by weight, and preferably 15-5 parts by weight. Although related to the amount of component B, if the blended amount of component C is excessively low, effects resulting in improvement of the dispersability of the styrene resin of component B with respect to the polyacetal resin of component A are not obtained, resulting in a poor surface in the case of the molded product, and other impairments such as the occurrence of surface layer peeling, thus making this undesirable. If both component B and component C are in excess, since the characteristics of the polyacetal resin are diminished, a total blended amount for these two components of 45 parts by weight or less is generally considered to be desirable.

As was described above, if polyacetal is simply melted and kneaded with a polystyrene resin, the resin phase of the dispersed polystyrene will appear on the surface of injection molded products in the form of streaked phase separation structures. In addition, surface layer peeling will also occur due to friction. These phenomenon is believed that the surface layer peeling occur due to the poor adhesion between the polystyrene phase and polyacetal phase, when the resin phase of the polystylene resin becomes layer structure due to the deformation of the resin phase owing to high shearing force which occurs in the vicinity of the surface layer during injection molding. In other words, it is considered that in order to suppress the formation of layers due to deformation of both phases and improve the adhesion between the two, by simultaneously melting and kneading of a specific thermoplastic acrylic resin, the acrylic resin will become interposed at the interface between the polystyrene and polyacetal layers, thereby improving the adhesion of both, and that, as a result, this not only prevent surface layer peeling, but also improves the surface quality of molded products and frictional abrasion characteristics.

Furthermore, in addition to above-mentioned components A, B and C, the polyacetal resin composition of the present invention may also be blended with a fibrous filler(s) such as glass fiber or carbon fiber, as well as other types of fillers according to the particular purpose, such as for improved mechanical strength, heat resistance, dimensional stability or electrical characteristics.

In addition, antioxidants, heat stabilizers, lubricants, crystallization agents, UV absorption agents, coloring agents, mold releasing agents or other common additives may be added to the composition of the present invention. Furthermore, small amounts of other auxiliary thermoplastic resins may also be blended.

In addition, although the composition of the present invention may be prepared using various known methods, it is at least necessary that the three components A, B and C be heated and melted together and then kneaded for at least 30 seconds. Other components may be blended in at the same time or added separately. As a specific example of such a method, after uniformly mixing components A, B and C with a mixer such as a tumbler or Henschel mixer in advance, the mixture is supplied to a single or double shaft extruder wherein it is melted and kneaded. This mixture may then be formed into pellets and then molded or molded directly after melting and kneading.

The temperature used for processing is 5°-100° C. higher than the temperature at which the resin components melt, and preferably 10°-60° C. higher than the melting points. If processing is performed at excessively high temperatures, decomposition and abnormal reactions will occur, thus making this undesirable.

In addition, the processing time for melting and kneading should be at least 30 seconds and no more than 15 minutes, and preferably from 1-10 minutes.

Since the present composition which comprises polyacetal as a main component and specific amounts of polystyrene resin and polyacrylic resin, retains the characteristics of polyacetal resins, eliminates the occurrence of peeling phenomenon on the surface of molded products like that observed in blended compositions of polystyrene resins of the prior art caused by defective dispersion and affinity between the two, while also eliminating difficulties in terms of molding processing, demonstrating superior frictional abrasion characteristics by yielding a uniform and smooth surface, reducing shrinkage percentage during molding, a major fault of polyacetal resins, and being effective in improving the dimensional accuracy of molded products, it can be expected to be used in wide range of applications.

EXAMPLE

The following provides a detailed description of examples of the present invention. However, the present invention is not limited to these examples.

Examples 1-5

As indicated in Table 1, polyacetal resin (A) (Polyplastics, Duracon), polystyrene resin (B), and polymethyl methacrylate (C) (PMMA) are mixed in the proportions (parts by weight) indicated in Table 1. The mixtures were melt-kneaded by using a twin-screw extruder having an inner diameter of 30 mm at a set temperature of 190° C. at a screw speed of 80 rpm to form into pellets. Next, testpieces were prepared by molding said pellets using an injection molding machine at a resin temperature of 200° C. An evaluation of the physical properties of the testpieces was conducted as indicated below.

Tensile Strength: Performed in compliance with the method described in ASTM D638.

Surface Peeling Test: Adhesive tape was attached to the surface of the testpiece used in tensile strength testing and then suddenly peeled off. The presence of peeling of the surface of the molded product was then examined visually.

Shrinkage Percentage: After accurately measuring one dimension of the ASTM tensile strength testpiece in a fixed direction, the shrinkage percentage was determined as the difference (%) between the measured dimension of the testpiece and the corresponding mold dimension.

Frictional Abrasion Test: The amount of specific abrasion with respect to S55C steel was measured using the Suzuki-type frictional abrasion tester.

These results are indicated in Table 1.

Comparative Examples 1-6

Other than using polyacetal resin alone, polystyrene resin alone as well as a two-component system of polyacetal resin and polystyrene, and moreover, using a combination in which the blended amount of polymethyl methacrylate is outside the range specified in the present invention, compositions were prepared using a similar method as that in examples 1-5 followed by molding and evaluation. Those results are also indicated in Table 1.

TABLE 1

|  | Examples | | | | | Comparative Examples | | | | | |
|---|---|---|---|---|---|---|---|---|---|---|---|
|  | 1 | 2 | 3 | 4 | 5 | 1 | 2 | 3 | 4 | 5 | 6 |
| (A) Polyacetal (MRF = 9) (parts by weight) | 85 | 80 | 60 | 87 | 70 | 100 | — | 90 | 90 | 80 | 89 |
| (B) Polystyrene (MRF = 12) (parts by weight) | 5 | 10 | 30 | 10 | 15 | — | 100 | 10 | — | 20 | 10 |
| (C) PMMA (parts by weight) | 10 | 10 | 10 | 3 | 15 | — | — | — | 10 | — | 1 |
| Surface Peeling | NO | NO | NO | NO | NO | NO | NO | YES | NO | YES | SLIGHT |
| Specific Abrasion ($\times 10^{-3}$ mm$^3$/ kgf-km) | 30 | 22 | 17 | 20 | 25 | 32 | 15 | 40 | 205 | 52 | 35 |
| Molding Shrinkage Percentage (%) | 1.7 | 1.5 | 1.0 | 1.8 | 1.1 | 2.2 | 0.5 | 2.0 | 2.0 | 1.9 | 2.0 |
| Tensile Strength (kg/cm$^2$) | 571 | 587 | 552 | 613 | 512 | 624 | 374 | 598 | 509 | 541 | 560 |

Examples 6-10, Comparative Examples 7-10

Other than using styrene-acrylonitrile copolymer (AS) in place of the polystyrene resin in examples 1-5 and comparative examples 1-6, compositions were prepared using similar methods, followed by molding and evaluation. Those results are both indicated in Table 2.

TABLE 2

|  | Examples | | | | | Comparative Examples | | | | | |
|---|---|---|---|---|---|---|---|---|---|---|---|
|  | 6 | 7 | 8 | 9 | 10 | 1 | 7 | 8 | 4 | 9 | 10 |
| (A) Polyacetal (MRF = 9) (parts by weight) | 85 | 80 | 60 | 87 | 70 | 100 | — | 90 | 90 | 80 | 89 |
| (B) AS (MRF = 15) (parts by weight) | 5 | 10 | 30 | 10 | 15 | — | 100 | 10 | — | 20 | 10 |
| (C) PMMA (parts by weight) | 10 | 10 | 10 | 3 | 15 | — | — | — | 10 | — | 1 |
| Surface Peeling | NO | NO | NO | NO | NO | NO | NO | YES | NO | YES | SLIGHT |
| Specific Abrasion ($\times 10^{-3}$ mm$^3$/ kgf-km) | 48 | 44 | 35 | 44 | 46 | 32 | 85 | 95 | 205 | 107 | 86 |
| Molding Shrinkage Percentage (%) | 1.7 | 1.4 | 0.9 | 1.8 | 0.9 | 2.2 | 0.4 | 2.0 | 2.0 | 1.8 | 1.9 |
| Tensile Strength (kg/cm$^2$) | 615 | 654 | 701 | 686 | 623 | 624 | 813 | 652 | 509 | 684 | 661 |

Examples 11-15, Comparative Examples 11-14

Other than using ABS resin in place of component (B), compositions were prepared using a method similar to that in above-mentioned examples 1-5 and comparative examples 1-6, followed by molding and evaluation. Those results are indicated in Table 3.

TABLE 3

|  | Examples | | | | | Comparative Examples | | | | | |
|---|---|---|---|---|---|---|---|---|---|---|---|
|  | 11 | 12 | 13 | 14 | 15 | 1 | 11 | 12 | 4 | 13 | 14 |
| (A) Polyacetal (MRF = 9) (parts by weight) | 85 | 80 | 60 | 87 | 70 | 100 | — | 90 | 90 | 80 | 89 |
| (B) ABS (MRF = 15) (parts by weight) | 5 | 10 | 30 | 10 | 15 | — | 100 | 10 | — | 20 | 10 |
| (C) PMMA (parts by weight) | 10 | 10 | 10 | 3 | 15 | — | — | — | 10 | — | 1 |
| Surface Peeling | NO | NO | NO | NO | NO | NO | NO | NO | NO | Slight | NO |

TABLE 3-continued

|  | Examples | | | | | Comparative Examples | | | | | |
|---|---|---|---|---|---|---|---|---|---|---|---|
|  | 11 | 12 | 13 | 14 | 15 | 1 | 11 | 12 | 4 | 13 | 14 |
| Specific Abrasion ($\times 10^{-3}$ mm$^3$/kgf-km) | 94 | 91 | 100 | 86 | 109 | 32 | 155 | 122 | 205 | surface streaking 209 | 120 |
| Molding Shrinkage Percentage (%) | 1.8 | 1.3 | 0.9 | 1.8 | 1.1 | 2.2 | 0.4 | 1.8 | 2.0 | 1.6 | 1.8 |
| Tensile Strength (kg/cm$^2$) | 603 | 524 | 496 | 546 | 501 | 624 | 441 | 522 | 509 | 506 | 524 |

Examples 16–18, Comparative Examples 15–17

Other than using substances for component (C) in which the methyl groups of polymethyl methacrylate (PMMA) in example 2 and comparative example 4 were changed to ethyl groups (PNC2MA), to n-octyl groups (PNC8MA) and to n-decyl groups (PNC12MA), compositions were prepared using a method similar to that in example 2 and comparative example 4, followed by molding and evaluation. Those results are indicated in Table 4.

TABLE 4

|  | Examples | | | Comparative Examples | | |
|---|---|---|---|---|---|---|
|  | 16 | 17 | 18 | 15 | 16 | 17 |
| (A) Polyacetal (MRF = 9) (parts by weight) | 85 | 80 | 80 | 90 | 90 | 90 |
| (B) Polystyrene (MRF = 12) (parts by weight) | 10 | 10 | 10 | — | — | — |
| (C) PNC2MA (parts by weight) | 10 | — | — | 10 | — | — |
| PNC8MA (parts by weight) | — | 10 | — | — | 10 | — |
| PNC12MA (parts by weight) | — | — | 10 | — | — | 10 |
| Surface Peeling | NO | NO | NO | NO | NO | NO |
| Specific Abrasion ($\times 10^{-3}$ mm$^3$/kgf-km) | 25 | 31 | 51 | 215 | 243 | 237 |
| Molding Shrinkage Percentage (%) | 1.5 | 1.5 | 1.6 | 2.0 | 2.0 | 2.0 |
| Tensile Strength (kg/cm$^2$) | 576 | 579 | 565 | 502 | 498 | 491 |

Example 19, Comparative Example 18

Compositions were prepared in the same manner as in example 3 using the same component A (MRF=9) and component C as in example 3, but using polystyrene having a different MRF value for component B. Molding was then performed using these compositions. As a result, in the case of component B of MRF(B)=4, or in other words, MRF(B)/MRF(A)=4/9 (example 19), both composition preparation and molding were possible under the same conditions, and values of physical properties were obtained which were nearly the same as those of example 3. However, in the case of MRF(B)=2, or in other words, MRF(B)/MRF(A)=2/9 (comparative example 18), an increase in the load occurred during preparation of the composition and insufficient filling occurred during molding. As a result, increased temperature and injection pressure were required, and the moldability of this composition was considered to be unsatisfactory.

We claim:

1. A moldable polyacetal resin composition capable of forming a molded article having good surface conditions, comprising, based on 100 parts by weight of the composition:
   between 55 to 95 parts by weight of a polyacetal resin component A;
   between 3 to 43 parts by weight of a thermoplastic polystyrene resin component B; and
   between 2 to 20 parts by weight of a thermoplastic acrylic resin component C which is a methacrylate homopolymer or a methacrylate copolymer consisting of units derived from two different methacrylates, wherein
   said polyacetal resin component A and said polystyrene resin component B have a melt flow rate satisfying the following relation (1):

$$\text{MRF(B)/MRF(A)} = \tfrac{1}{3} \text{ to } 50 \tag{1}$$

wherein MRF(A) represents the melt flow rate of the polyacetal resin component A determined at 190° C. under a load of 2160 grams according to ASTM D-1238, and MRF(B) represents the melt flow rate of the thermoplastic polystyrene resin component B determined at 200° C. under a load of 500 grams according to ASTM D-1238.

2. A polyacetal resin composition according to claim 1, wherein the thermoplastic polystyrene component B is polystyrene or a copolymer resin comprising polystyrene as the main component and acrylonitrile and/or butadiene and/or acrylic acid and/or acrylate.

3. A polyacetal resin composition according to claim 1, wherein said thermoplastic acrylic resin component C is a methacrylate homopolymer selected from the group consisting of methyl methacrylate, ethyl methacrylate, n-propyl methacrylate, isopropyl methacrylate, n-butyl methacrylate, isobutyl methacrylate, n-amyl methacrylate, n-octyl methacrylate and n-decyl methacrylate.

4. A polyacetal resin composition according to claim 1, wherein said thermoplastic acrylic resin component C is a methyl methacrylate homopolymer or a copolymer consisting of units derived from methyl methacrylate as a main monomer, and a methacrylate other than methyl methacrylate as a comonomer.

* * * * *